(12) United States Patent
Whale

(10) Patent No.: US 7,374,228 B2
(45) Date of Patent: May 20, 2008

(54) TOY VEHICLE ADAPTED FOR MEDICAL USE

(76) Inventor: Spencer R. Whale, 91 Locust Ct., Pittsburgh, PA (US) 15237

( * ) Notice: Subject to any disclaimer, the term of this patent is extended or adjusted under 35 U.S.C. 154(b) by 405 days.

(21) Appl. No.: 11/045,586

(22) Filed: Jan. 26, 2005

(65) Prior Publication Data

US 2005/0161933 A1    Jul. 28, 2005

Related U.S. Application Data

(60) Provisional application No. 60/539,501, filed on Jan. 26, 2004.

(51) Int. Cl.
*B60R 11/00* (2006.01)
(52) U.S. Cl. .................. 296/177; 280/838
(58) Field of Classification Search ........... 296/177, 296/19; 280/830, 838
See application file for complete search history.

(56) References Cited

U.S. PATENT DOCUMENTS

| | | | | |
|---|---|---|---|---|
| 5,236,390 A | * | 8/1993 | Young | 454/95 |
| 5,337,845 A | * | 8/1994 | Foster et al. | 180/11 |
| 5,573,300 A | * | 11/1996 | Simmons | 296/193.04 |
| 5,755,479 A | * | 5/1998 | Lavin et al. | 296/24.38 |
| 6,273,444 B1 | * | 8/2001 | Power | 280/304.1 |
| 6,601,860 B2 | * | 8/2003 | Potter | 280/47.34 |
| 6,880,189 B2 | * | 4/2005 | Welling et al. | 5/624 |
| 7,007,761 B1 | * | 3/2006 | Johnson, IV | 169/24 |

* cited by examiner

*Primary Examiner*—Kevin Hurley
(74) *Attorney, Agent, or Firm*—Michael S. Neustel

(57) ABSTRACT

A toy vehicle adapted for medical use for providing a vehicle that transports a child and their required medical equipment. The toy vehicle adapted for medical use includes a vehicle with a plurality of wheels and a seating area, a receiver cavity within a rear portion of the vehicle for receiving one or more tanks, and an aperture within the rear portion of the vehicle for receiving an IV pole. If the vehicle is manually powered or the medical equipment weighs significantly more than the front portion of the vehicle, a counterbalancing weight is attached within the front portion of the vehicle to provide increased stability. The vehicle may be powered manually or via an engine.

10 Claims, 7 Drawing Sheets

TOY VEHICLE ADAPTED FOR MEDICAL USE

CROSS REFERENCE TO RELATED APPLICATIONS

I hereby claim benefit under Title 35, United States Code, Section 119(e) of U.S. provisional patent application Ser. No. 60/539,501 filed Jan. 26, 2004. The 60/539,501 application is currently pending. The 60/539,501 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to toy vehicles and more specifically it relates to a toy vehicle adapted for medical use for providing a vehicle that transports a child and their required medical equipment.

2. Description of the Related Art

Any discussion of the prior art throughout the specification should in no way be considered as an admission that such prior art is widely known or forms part of common general knowledge in the field.

Toy vehicles have been in use for years and are well known in the art of toys. Typically, toy vehicles have been used only for recreational or entertainment purposes. These toy vehicles often times include actuators (e.g. electric, gas powered) to move the vehicle or have been powered by physical force of the user through pushing or pedaling the vehicle.

Many children are currently in the hospital with various illnesses that do not allow the children to utilize a toy vehicle due to the medical equipment that must accompany them at all times. These children often undergo medical treatments or procedures that require extended stays in a hospital. The children are often bed-ridden because they have so much medical equipment connected to them that moving around the hospital is an onerous process. The chance to play with toys or other children can be nearly impossible. The recovery time for children in hospitals is likely extended due to the lack of social interaction or creative outlets.

In these respects, the toy vehicle adapted for medical use according to the present invention substantially departs from the conventional concepts and designs of the prior art, and in so doing provides an apparatus primarily developed for the purpose of providing a vehicle that transports a child and their required medical equipment.

BRIEF SUMMARY OF THE INVENTION

In view of the foregoing disadvantages inherent in the known types of toy vehicles now present in the prior art, the present invention provides a new toy vehicle adapted for medical use construction wherein the same can be utilized for providing a vehicle that transports a child and their required medical equipment.

The general purpose of the present invention, which will be described subsequently in greater detail, is to provide a new toy vehicle adapted for medical use that has many of the advantages of the toy vehicles mentioned heretofore and many novel features that result in a new toy vehicle adapted for medical use which is not anticipated, rendered obvious, suggested, or even implied by any of the prior art toy vehicles, either alone or in any combination thereof.

To attain this, the present invention generally comprises a vehicle with a plurality of wheels and a seating area, a receiver cavity within a rear portion of the vehicle for receiving one or more tanks, and an aperture within the rear portion of the vehicle for receiving an IV pole. If the vehicle is manually powered or the medical equipment weighs significantly more than the front portion of the vehicle, a counterbalancing weight is attached within the front portion of the vehicle to provide increased stability. The vehicle may be powered manually or via an engine.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a toy vehicle adapted for medical use that will overcome the shortcomings of the prior art devices.

A second object is to provide a toy vehicle adapted for medical use for providing a vehicle that transports a child and their required medical equipment.

Another object is to provide a toy vehicle adapted for medical use that allows children who are hooked up to medical equipment to move more freely around a hospital.

An additional object is to provide a toy vehicle adapted for medical use that allows children who are hooked up to medical equipment to socialize with other people outside of their room.

A further object is to provide a toy vehicle adapted for medical use that facilitates social interactions and creative outlets that are therapeutic and can shorten a hospital stay.

Another object is to provide a toy vehicle adapted for medical use that is capable of being adapted to hold a wide variety of medical devices.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
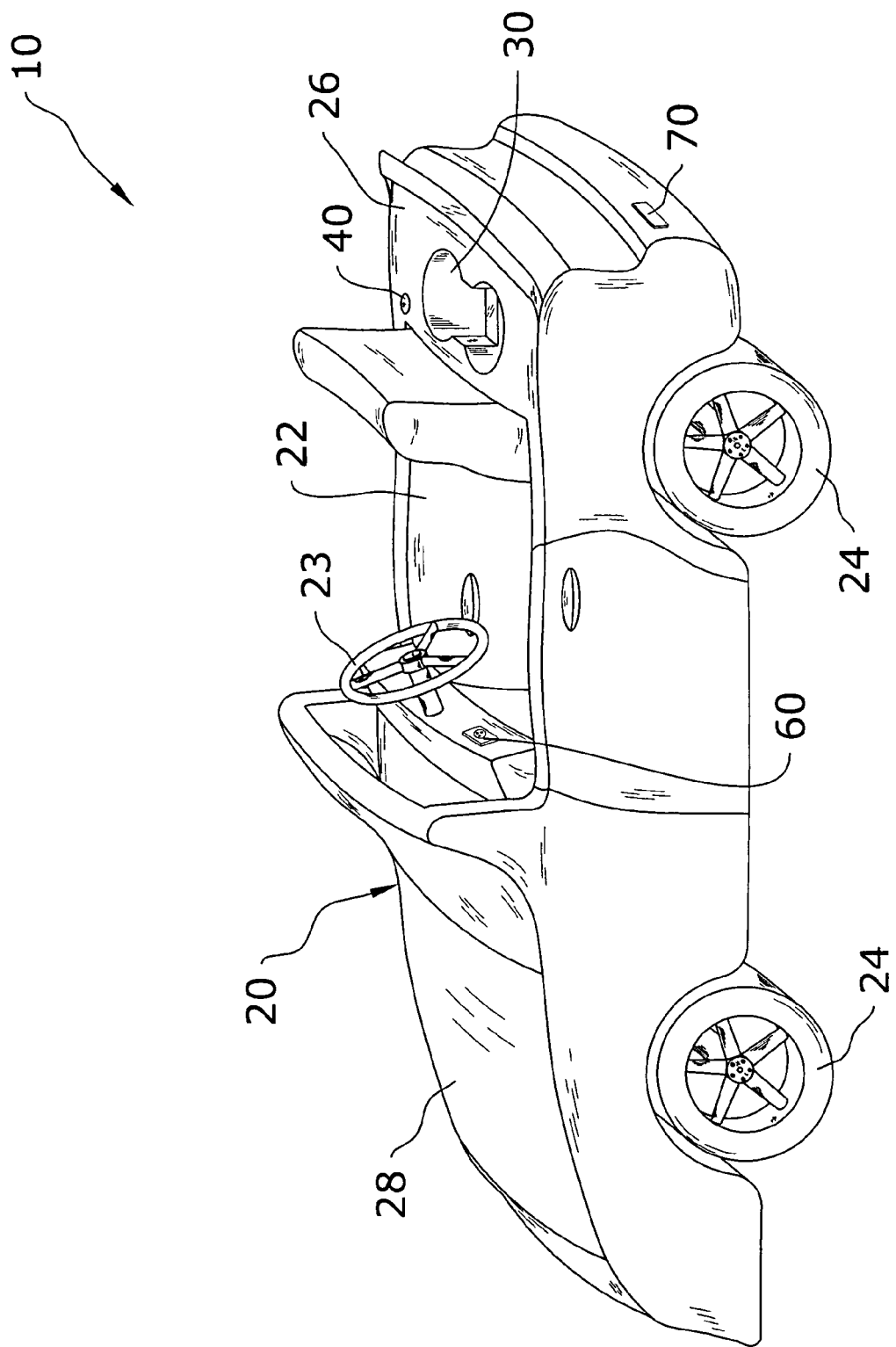
FIG. 1 is an upper perspective view of the present invention.

Turning now descriptively to the drawings, in which similar reference characters denote similar elements throughout the several views, FIGS. 1 through 7 illustrate a toy vehicle adapted for medical use 10, which comprises a vehicle 20 with a plurality of wheels 24 and a seating area 22, a receiver cavity 30 within a rear portion 26 of the vehicle 20 for receiving one or more tanks, and an aperture 40 within the rear portion 26 of the vehicle 20 for receiving an IV pole 12. If the vehicle 20 is manually powered or the medical equipment weighs significantly more than the front portion 28 of the vehicle 20, a counterbalancing weight 50 is attached within the front portion 28 of the vehicle 20 to provide increased stability. The vehicle 20 may be powered manually or via an engine.

B. Vehicle

As shown in FIGS. 1 through 7 of the drawings, the vehicle 20 preferably includes a plurality of wheels 24, a seating area 22, a steering wheel 23, a front portion 28 and a rear portion 26. The seating area 22 is capable of receiving at least one child in a seated manner. The steering wheel 23 allows for control over the front wheels 24 of the vehicle 20 to steer the vehicle 20. The vehicle 20 may be manually powered (pedals, stepping or pushing), electrically powered, gas powered and the like. The vehicle 20 may be comprised of any well-known conventional toy device capable of supporting at least one child.

C. Receiver Cavity and Aperture

As best shown in FIG. 1 of the drawings, at least one receiver cavity 30 is positioned within the rear portion 26 of the vehicle 20 for receiving one or more medical tanks 14 (e.g. oxygen tank, e-cylinders, etc.). The receiver cavity 30 is preferably formed to snugly receive the medical tanks 14 to reduce movement and possible accidental removal of the medical tanks 14.

Figure 2:
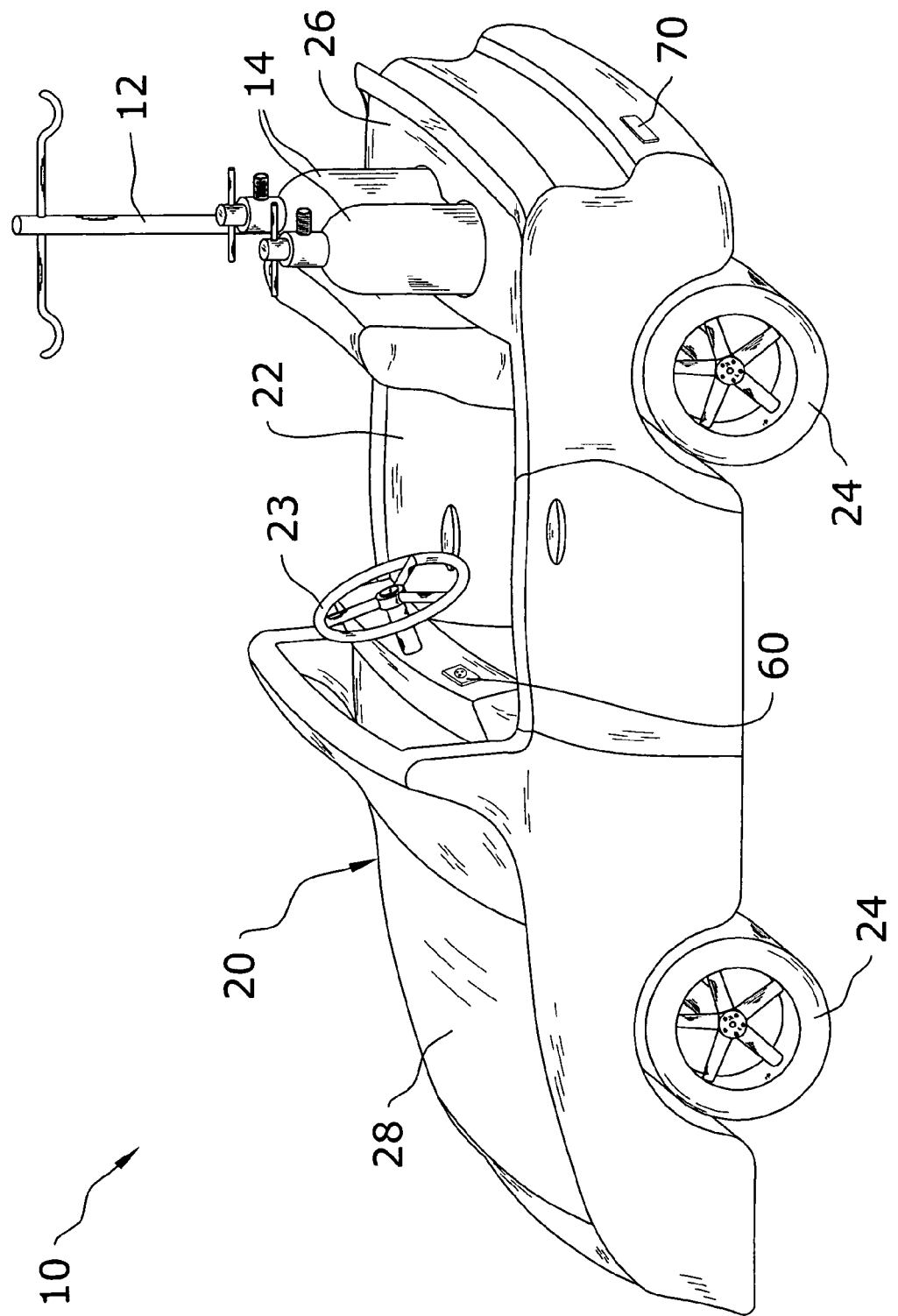
FIG. 2 is an upper perspective view of the present invention holding oxygen tanks and having an IV pole attached.
Figure 3:
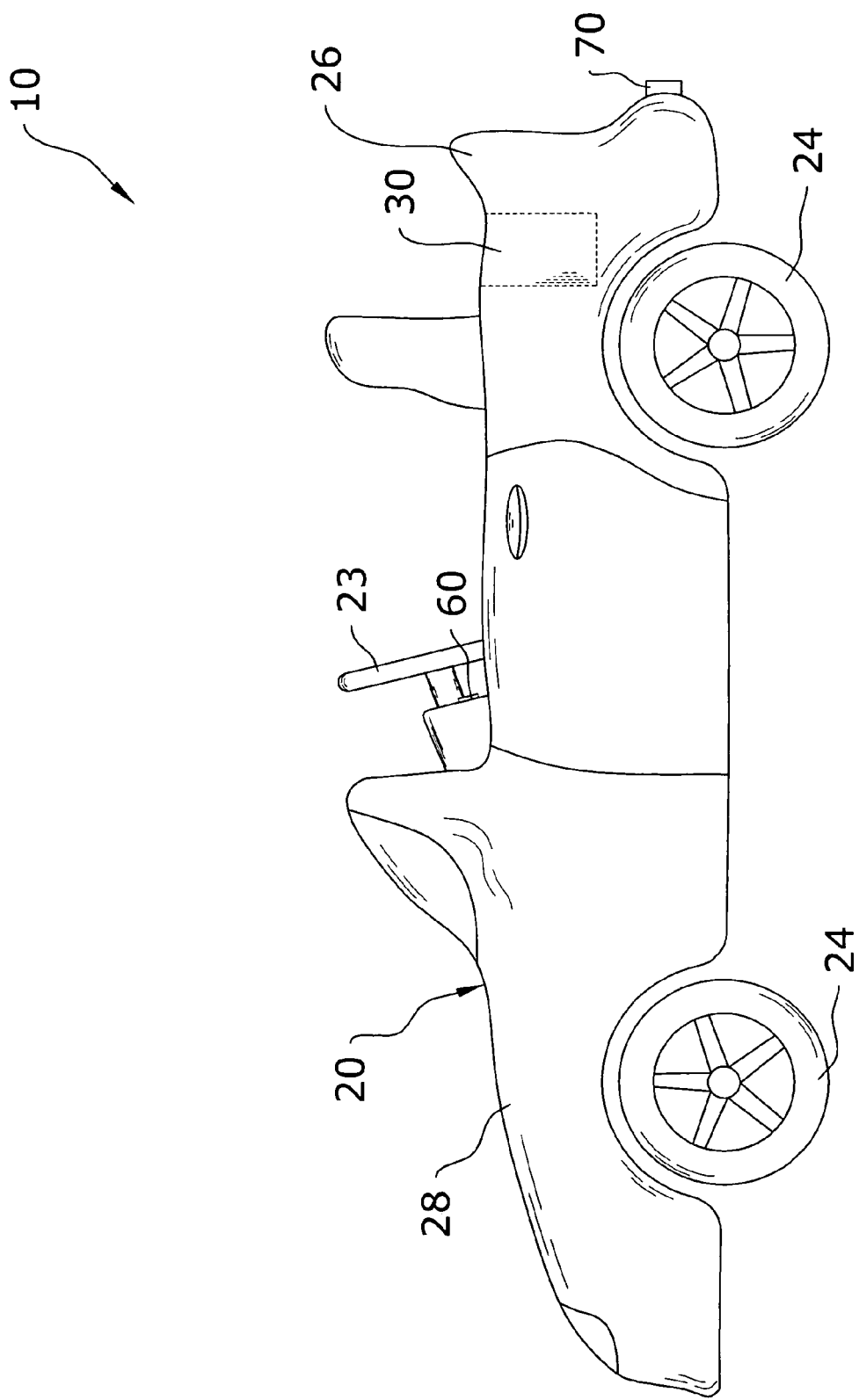
FIG. 3 is a side view of the present invention.
Figure 6:
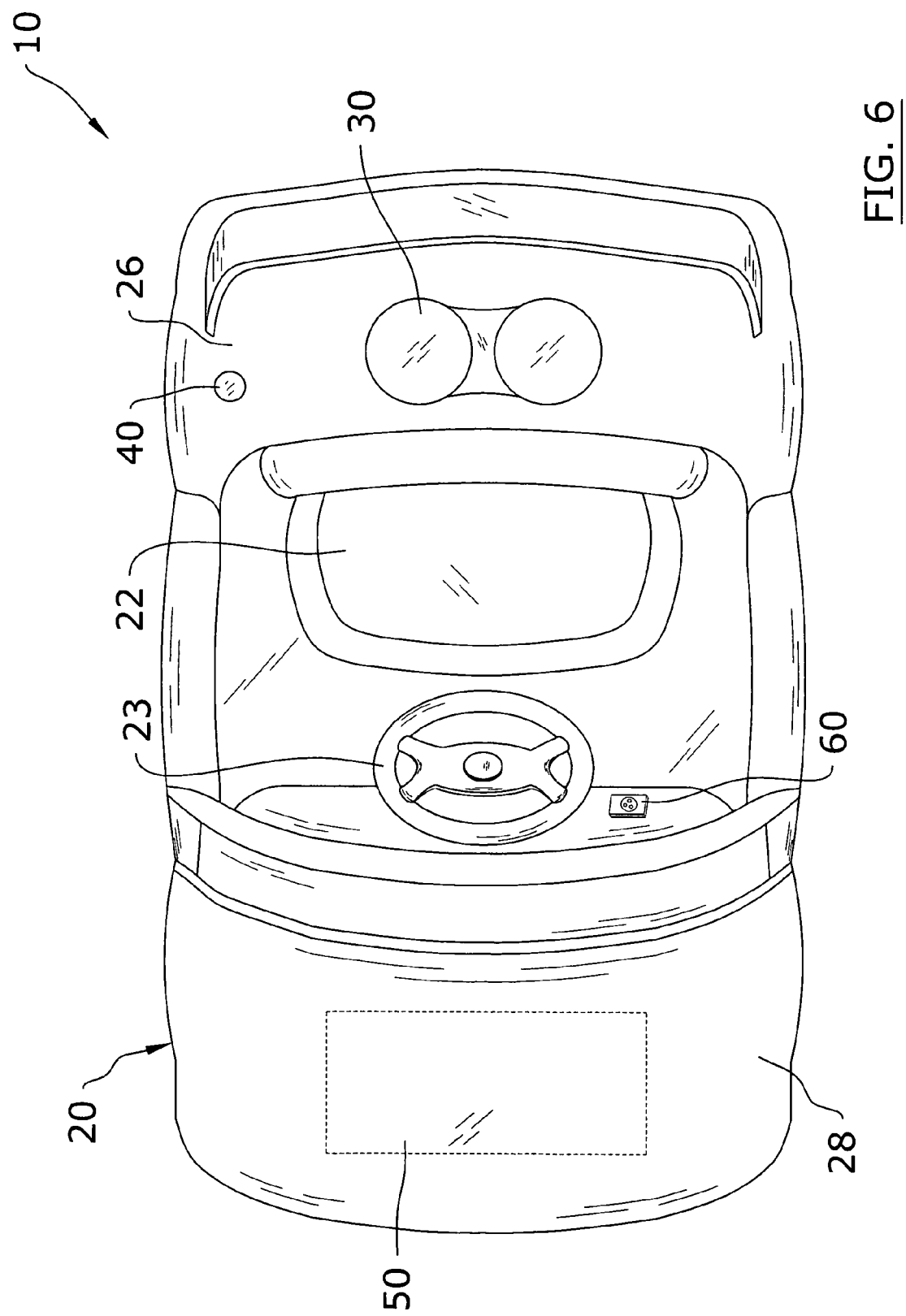
FIG. 6 is a top view of the present invention.
Figure 7:
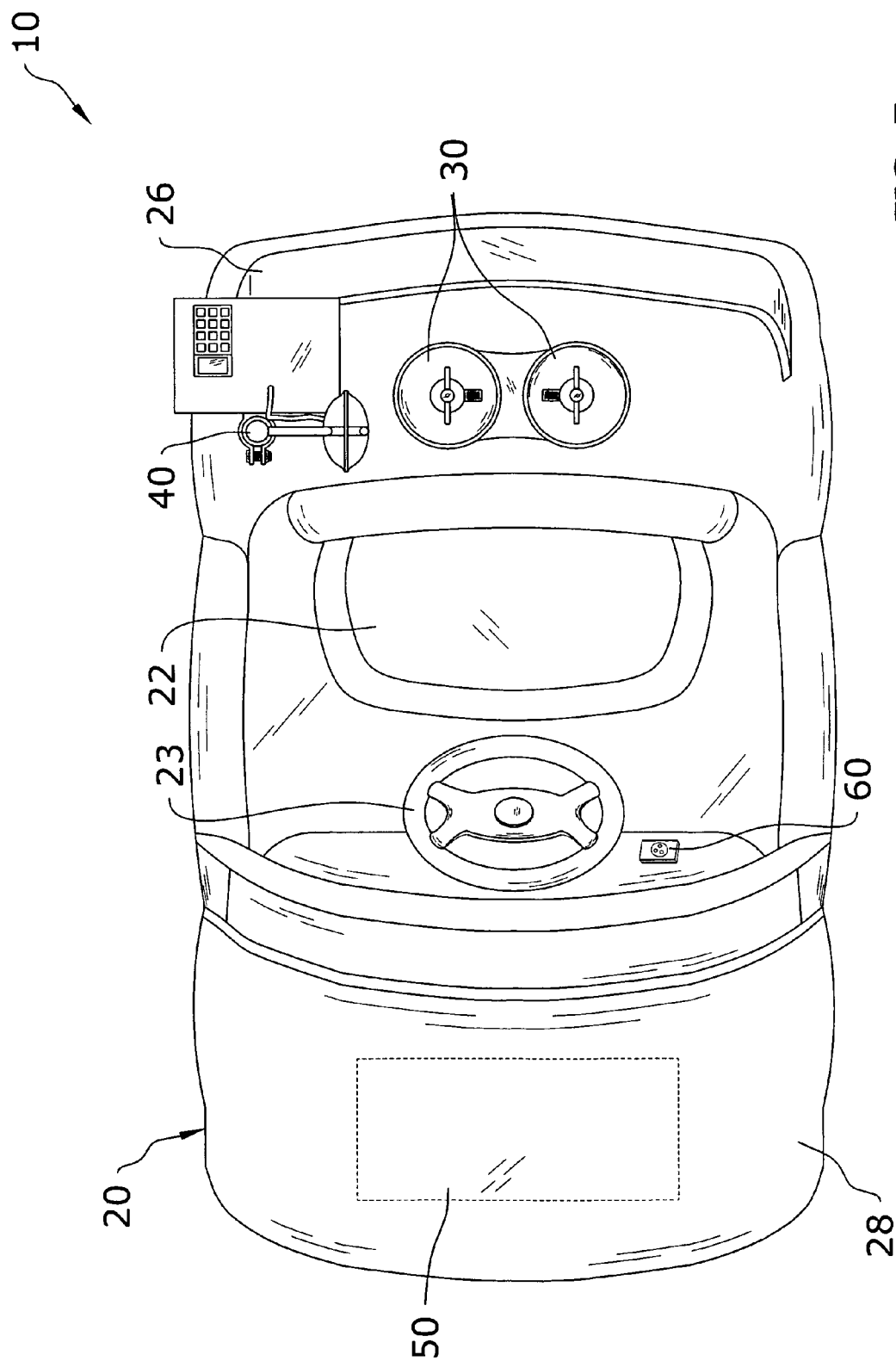
FIG. 7 is a top view of the present invention holding oxygen tanks and having an IV pole, IV drip bag and IVAC unit attached.

As shown in FIGS. 1 and 6 of the drawings, the receiver cavity 30 preferably has two compartments for receiving two medical tanks 14 simultaneously in a side-by-side upright manner. FIGS. 2 and 7 illustrate the medical tanks 14 fully positioned within the receiver cavity 30. The receiver cavity 30 preferably has a figure-eight shape defining the two compartments, however other structures may be utilized to define the receiver cavity 30.

Figure 4:
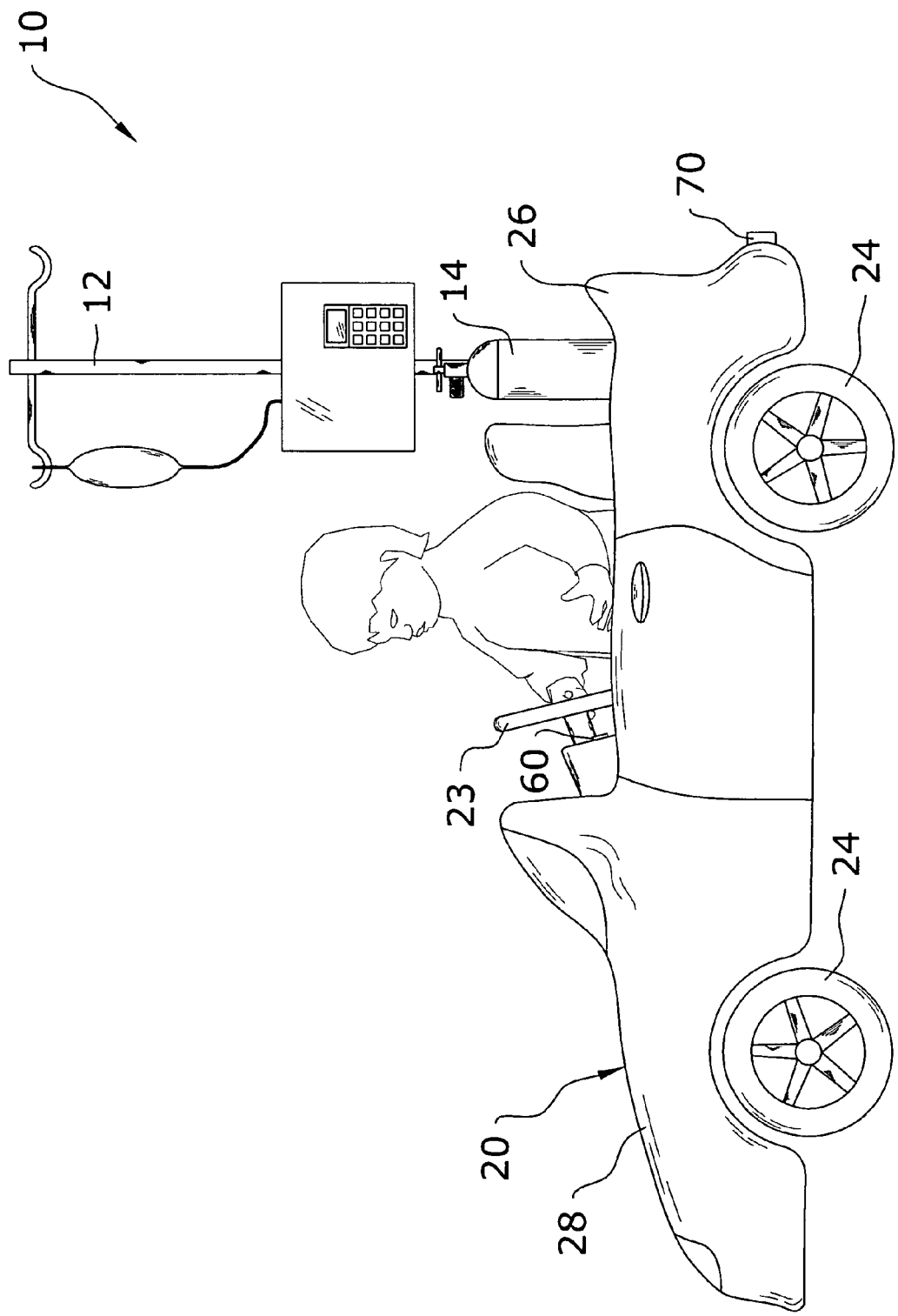
FIG. 4 is a side view of the present invention holding oxygen tanks and having an IV pole and IVAC unit attached.
Figure 5:
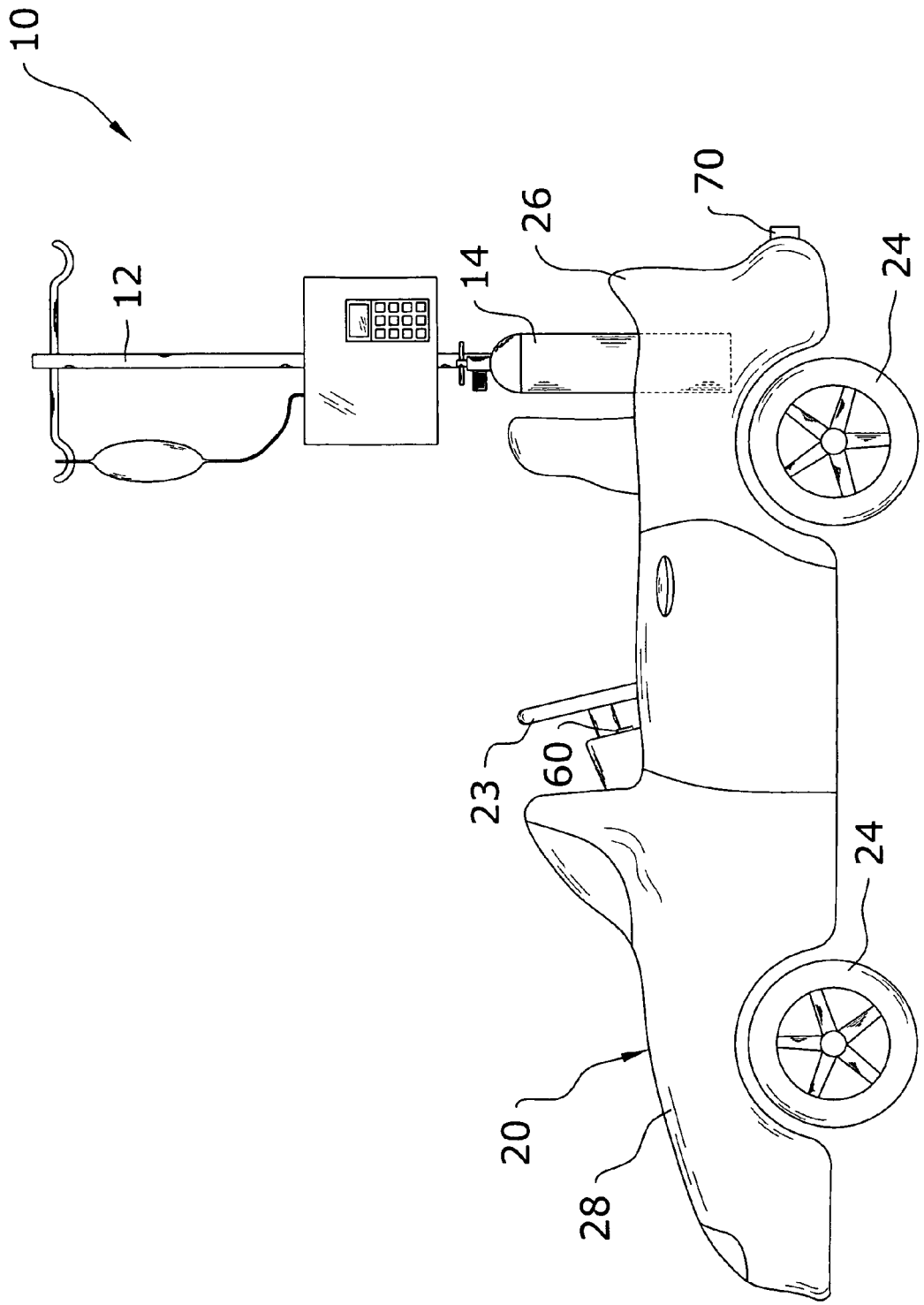
FIG. 5 is a a side view of the present invention holding oxygen tanks and having an IV pole, IV drip bag and IVAC unit attached.

At least one aperture 40 is positioned within the rear portion 26 or side portion of the vehicle 20 for receiving one or more IV poles 12 as shown in FIG. 1 of the drawings. The aperture 40 is capable of removably receiving the one or more IV poles 12 in a substantially vertical manner as shown in FIGS. 2 and 4 of the drawings.

D. Counterbalancing Weight

As shown in FIGS. 6 and 7 of the drawings, a counterbalancing weight 50 is preferably positioned within the front portion 28 of the vehicle 20 (or side portions) to counterbalance the medical equipment attached to the rear portion 26 and side portions of the vehicle 20. The counterbalancing weight 50 may be comprised of various types of materials. If a relatively heavy motor (gas or electric) is utilized to drive the vehicle 20, then the motor may be positioned within the front portion 28 of the vehicle 20 to counterbalance the weight 50 of the medical equipment.

E. Tracking System

A tracking device 70 within the vehicle 20 is preferably used for allowing a third-party to monitor and track the physical location of the vehicle 20 within a building structure as shown in FIG. 1 of the drawings. The tracking device 70 may utilize any conventional tracking technology suitable for usage within a building structure that may be monitored via a central monitoring location and device.

F. Transceiver Communication System

As shown in FIG. 1 of the drawings, a transceiver 60 device is positioned within the seating area 22 of the vehicle 20 for allowing bi-directional communications by the child with a third-party (e.g. nurse, parent, other child). The transceiver 60 device may be comprised of various well-known bi-directional communication devices currently available (e.g. cell phone, two-way radio, walkie-talkie, wireless data networks, etc.).

G. Operation of Invention

In use, the medical equipment is first properly attached to the vehicle 20 that the child will be riding in as shown in FIG. 2 of the drawings. The child then enters the seating area 22 and sits upon the seat as shown in FIG. 4 of the drawings. The child is either previously connected to the medical equipment or connected after being seated within the vehicle 20 depending upon the medical needs of the child. The child is then able to operate the vehicle 20 within a building structure (e.g. hospital) such as by driving down the hallways, into rooms and possibly outside.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A toy vehicle adapted for medical use, comprising:
a vehicle including a plurality of wheels, a seating area, a front portion and a rear portion, wherein said seating area is capable of receiving at least one child in a seated manner;
at least one receiver cavity within said rear portion of said vehicle for receiving one or more medical tanks, wherein said at least one receiver cavity has at least two compartments for receiving two or more medical tanks, wherein said at least one receiver cavity has a figure-eight shape; and at least one aperture within said rear portion of said vehicle for receiving one or more IV poles.

2. The toy vehicle adapted for medical use of claim 1, including a counterbalancing weight within said front portion of said vehicle.

3. The toy vehicle adapted for medical use of claim 2, wherein said counterbalancing weight is sufficient to substantially counterbalance a combined weight of the one or more medical tanks and one or more IV poles.

4. The toy vehicle adapted for medical use of claim 1, wherein said vehicle includes a steering wheel for steering said vehicle.

5. The toy vehicle adapted for medical use of claim 1, wherein said aperture is capable of removably receiving the one or more IV poles in a substantially vertical manner.

6. The toy vehicle adapted for medical use of claim 1, including a tracking device within said vehicle for allowing a third-party to monitor and track the physical location of said vehicle within a building structure.

7. The toy vehicle adapted for medical use of claim 1, including a transceiver device for allowing bi-directional communications with a third-party.

8. A toy vehicle adapted for medical use, comprising:

a vehicle including a plurality of wheels, a seating area, a steering wheel, a front portion and a rear portion, wherein said seating area is capable of receiving at least one child in a seated manner and wherein said steering wheel is capable of steering said vehicle;

at least one receiver cavity within said rear portion of said vehicle for receiving one or more medical tanks, wherein said at least one receiver cavity has at least two compartments for receiving two or more medical tanks, wherein said at least one receiver cavity has a figure-eight shape;

at least one aperture within said rear portion of said vehicle for receiving one or more IV poles, wherein said aperture is capable of removably receiving the one or more IV poles in a substantially vertical manner; and a counterbalancing weight within said front portion of said vehicle, wherein said counterbalancing weight is sufficient to substantially counterbalance a combined weight of the one or more medical tanks and one or more IV poles.

9. The toy vehicle adapted for medical use of claim 8, including a tracking device within said vehicle for allowing a third-party to monitor and track the physical location of said vehicle within a building structure.

10. The toy vehicle adapted for medical use of claim 8, including a transceiver device for allowing bi-directional communications with a third-party.

* * * * *